United States Patent [19]

Schempp et al.

[11] Patent Number: 4,483,709
[45] Date of Patent: Nov. 20, 1984

[54] STEEL PRODUCTION METHOD

[75] Inventors: Eberhard G. Schempp; Jai K. Pearce; David L. Schroeder, all of Pittsburgh, Pa.

[73] Assignee: Pennsylvania Engineering Corporation, Pittsburgh, Pa.

[21] Appl. No.: 577,526

[22] Filed: May 14, 1975

Related U.S. Application Data

[62] Division of Ser. No. 238,338, Mar. 27, 1972, Pat. No. 3,905,589.

[51] Int. Cl.³ .............................................. C21C 5/52
[52] U.S. Cl. .......................................... 75/12; 373/68
[58] Field of Search ................................. 75/10–12; 13/9

[56] References Cited

U.S. PATENT DOCUMENTS 3,459,867  8/1969  Estes ........................................ 13/9
3,902,889  9/1975  Malin ....................................... 75/12

Primary Examiner—Peter D. Rosenberg
Attorney, Agent, or Firm—Fred Wiviott

[57] ABSTRACT

A metallurgical vessel having an energy source and in which molten metal is contained for processing. A tuyere system is provided below the level of molten metal to permit the injection of gases, fluxes, ores, alloying additions and other materials to convert the molten metal to steel.

19 Claims, 5 Drawing Figures

STEEL PRODUCTION METHOD

This is a division of application Ser. No. 238,338 filed Mar. 27, 1972 now U.S. Pat. No. 3,905,589.

BACKGROUND OF THE INVENTION

In the production of steel, it is common practice to perform distinct process steps either in the same vessel or to perform a first portion of the process in one vessel and second portion in a separate vessel. For example, it is common in the use of electric arc furnaces for the processing of steel to employ separate slags for oxidation and refining. Initially, a melt down period is provided to form a molten bath. During oxidation, silicon, manganese, carbon and other materials in the melt are oxidized. The oxygen for this purpose may be provided in a number of ways, such as by an oxygen lance, the furnace atmosphere, the calcination of limestone or oxides from alloying elements and/or ores which may be added to the furnace charge. During the oxidation period, the melt is covered by an oxidizing slag which typically includes large percentages of oxides of iron, aluminum, magnesium, manganese and phosphorous. At the end of the oxidizing period, it is generally the practice to deslag the melt by cutting off the power to the electrodes which are then raised, tilting the furnace and racking off the oxidizing slag through a slag door. The furnace would then be charged with materials such as burnt lime, fluorspar, silicon, sand and powdered coke to form a reducing slag which would be maintained during the reducing period. The disadvantages of the multi-slag electric arc furnace steel making process is that it is relatively lengthy and results in a high iron loss as the result of the deslagging operation.

It is a common practice in electric arc steel making to preheat scrap before charging so as to reduce the duration of the meltdown period. This has not been wholly satisfactory because it involves additional handling and equipment.

There are also a number of metallurgical vessels presently employed which perform an inactive function, such as metal storage or are limited in the functions that can be performed, such as induction melting furnaces.

SUMMARY OF THE INVENTION

An object of the invention is to provide a metallurgical apparatus capable of performing its intended functions more rapidly than conventional apparatus of the same type.

A further object of the invention is to provide metallurgical apparatus capable of greater flexibility than conventional apparatus.

Another object of the invention is to provide metallurgical apparatus which is more economical to operate than conventional apparatus.

A still further object of the invention is to provide a more efficient and economical method of processing molten metal.

These and other objects and advantages of the instant invention will become more apparent from the detailed description thereof taken with the accompanying drawings.

DESCRIPTION OF THE PREFERRED EMBODIMENT

Figure 1:
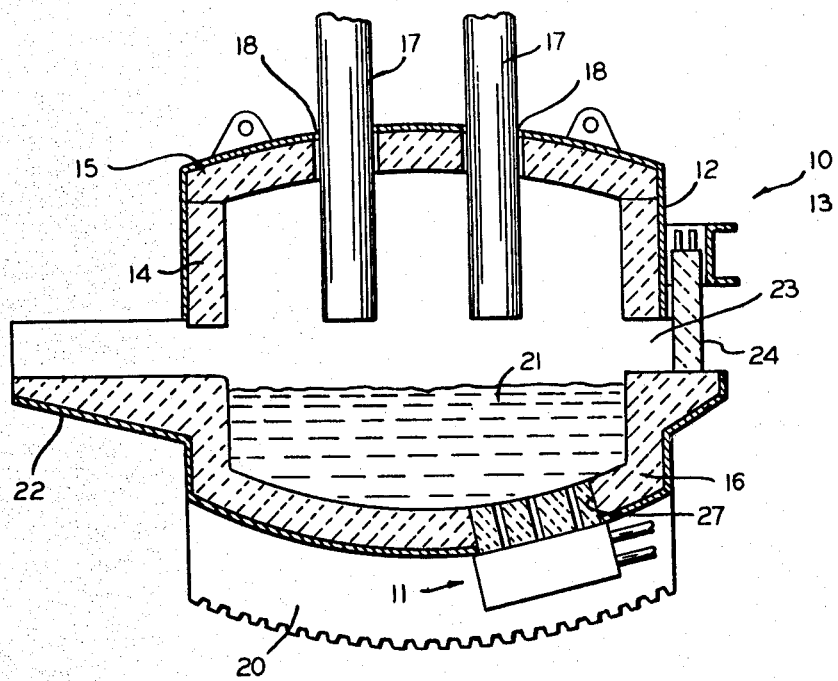
FIG. 1 schematically illustrates an electric arc furnace incorporating the instant invention.

FIG. 1 shows an electric arc furnace 10 incorporating the tuyere system 11 according to the instant invention. The furnace 10 includes a metallic shell 12 and a refractory lining 13. In the case of a basic furnace, the refractory lining would be composed of any suitable basic material, such as magnesite or high alumina brick. The furnace 10 generally includes a cylindrical body portion 14, an arched roof 15 and a dished hearth 16. A smoke hood, not shown, may be provided for venting gases and conducting the same to a gas cleaning apparatus (not shown).

One or more electrodes 17 extend through openings 18 formed in roof 16 for providing the heat energy input to the furnace. As those skilled in the art will appreciate, the number of electrodes will be determined by whether alternating or direct current energy is employed and whether the alternating current systems are single phases or polyphase. The electrodes 17 are supported by a support assembly 19 for moving the electrodes vertically relative to the hearth 16 and which generally include electrode clamps 20 for conducting electrical energy to the electrodes 17.

Electric arc furnaces of the type illustrated are typically mounted for pivotal movement such as by means of the rocker 21 so that the furnace 10 may be pivoted in a first direction to discharge the molten metal bath 22 from a pouring spout 23 and in the opposite direction to discharge slag through a deslagging door 24 at the opposite side of the furnace 10. The roof 15 of arc furnaces of the type illustrated in FIG. 1 are typically constructed and arranged to be lifted vertically by means of lugs 25 and swung laterally away from the furnace body to permit charging. At the same time, the electrodes 17 are raised by the mechanism 19 and similarly swung away from the furnace 10.

Figure 2:
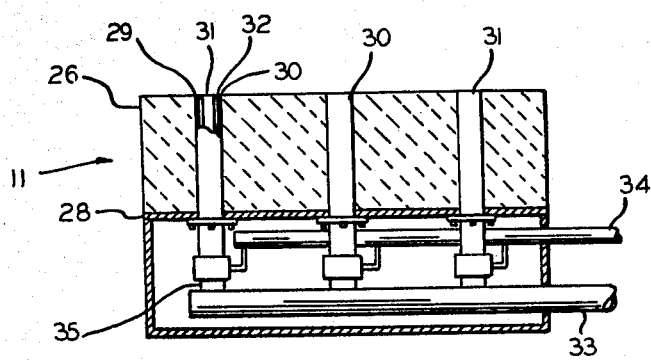
FIG. 2 shows the tuyere system of the furnace illustrated in FIG. 1 in greater detail.

As shown more specifically in FIG. 2, the furnace 10 is also provided with a tuyere system 11 which may include a monolithic refractory member 26 formed, for example, from any suitable cast, rammed or brick refractory material. The refractory member 26 is suitably received within an opening 27 formed in the hearth 16 and which is displaced off-center and toward the slag door 24 as seen in FIG. 1. Referring again to FIG. 2, a metallic backup plate 28 may be suitably secured to the under side of refractory member 26 and may be similarly received within an opening formed in the metallic outer shell 12. A plurality of spaced-apart tuyere passages 29 are formed in refractory member 26 and plate 28 for receiving a plurality of metallic tuyere assemblies. Each tuyere assembly includes a pair of concentrically spaced tuyere pipes 31 and 32 which are respectively coupled to manifold pipes 33 and 34. More specifically, the tuyere pipes 31 extend from manifold 33 and concentrically through the outer pipe 32 for conducting oxygen and entrained powdered material into the vessel. Each of the outer pipes 32 are connected to and supported by a union 35 through which the pipes 31 also pass. The unions in turn are connected by pipes 36 to the manifold pipe 34 for conducting a hydrocarbon fluid to the outer tuyere 32.

In operation of the furnace 10, the roof 15 and electrodes 17 will normally be swung away from the body of the furnace and the furnace charged, usually with scrap. The roof 15 is then repositioned and the electrodes 18 are energized to commence the meltdown. Initially, a molten bath begins to form in the hearth 16 at which time the blowing of the gases or other materials through the tuyere system 11 may commence. This will usually take the form of oxygen or an oxygen containing gas provided through the inner pipes 35 while a hydrocarbon fluid, such as propane gas, is injected through the outer tuyere passages 30 for the purpose of prolonging refractory life. When an inert gas, such as argon or nitrogen is injected into the bath 22, for reasons which will be described more fully below, the propane will not be required so that the same inert gas will normally be injected through both tuyere passages 31 and 32.

Alternately, the blowing of oxygen and hydrocarbon gases may commence prior to or during the meltdown period whereby the oxidation of the hydrocarbon acts to preheat the scrap and thereby shorten the meltdown period.

The tuyere system 11 may be offset with respect to the center of the hearth 16 and on the side closest to the slag door 24 so that the tuyere passages 30 and 35 will remain below the level of the bath 22 should it become necessary to tilt the vessel for deslagging.

This permits the continued injection of gases and other materials through tuyeres 30 during a deslagging operation so that the process need not be interrupted. Further, powdered material for a second slag may then be blown into the vessel through tuyeres 30. As an alternate, the tuyeres may be located so that they would be above the bath level during deslagging and/or pouring to prolong tuyere life. For example, the tuyeres could be located near the rotational axis of the vessel for the latter purpose.

Because an oxidizing gas is introduced into the bath during the oxidation period, the oxidation of elements such as phosphorous, silicon, manganese and carbon may proceed rapidly. The use of oxygen further promotes a vigorous boiling action in the bath 22 to promote the desired reactions as well as mixing to promote homogeneity. Desulphurization may be accomplished by the injection of powdered lime in the gas stream injected through inner tuyere 31. Further, if stainless or silicon steels are to be produced, a mixture of oxygen and an inert gas such as argon may be fed into the bath through the tuyere system 11. The argon reduces the partial pressure of CO in the bath so that a greater reduction in the carbon level may be obtained. After the bath 22 has been decarborized to the desired degree, the bath 22 may be reduced by the addition of suitable powdered materials such as lime, limestone, fluorspar or burnt lime and entrained in the gas stream through the tuyere system 11. Thus, even in the production of low carbon steels, a separate oxidizing slag and the subsequent deslagging step prior to reduction is not required. This not only shortens the process time but reduces iron loss from the melt. Further, final adjustments can also be made by the introduction of the requisite materials through the tuyere system 11. For example, if the carbon level is too low, a powdered carbonaceous material or a hydrocarbon gas can be introduced into the melt along with an inert gas such as argon or nitrogen. If a hydrocarbon fluid is introduced for recarburization, normally through the inner tuyere passage 35, an inert gas such as argon or nitrogen will be introduced through the outer tuyere passage 30. On the other hand, if a reduction in the carbon level is required, oxygen would be introduced through the inner tuyere passage 35 during this period and a hydrocarbon gas introduced through outer tuyere passage 30. Also, the bath can be efficiently purged of hydrogen or nitrogen by the introduction of an inert gas such as argon. Additionally, bath temperature can be closely controlled either by the introduction of oxygen to increase temperature, or coolants such as lime or iron ore entrained in an inert carrier gas, such as argon. In this manner, the use of the tuyere system 11 in the arc furnace 10 substantially reduces the operating time required because the various chemical reactions are facilitated by the introduction of oxidizing and reducing materials through the bath rather than relying on the interaction between the bath and the slag. The desired chemical reactions are also promoted as a result of the mixing action caused by the introduction of gases through the tuyere system 11.

Figure 3:
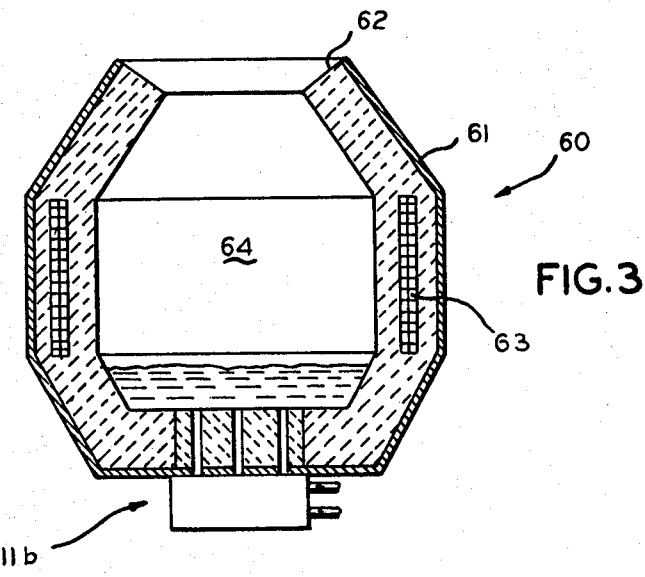
FIG. 3 schematically illustrates an induction furnace incorporating the instant invention.

FIG. 3 schematically illustrates an induction furnace 60. In general terms, furnace 60 includes an outer metallic shell 61 and a refractory lining 62. A generally annular induction coil 63 may be embedded in the lining 62 and in a generally surrounding relation to the inner chamber 64 of furnace 60. A tuyere assembly 11b is disposed in the lower end of the furnace 60 and may be identical to that shown in FIG. 2 and accordingly will not be discussed in detail for the sake of brevity.

As those skilled in the art will appreciate, when the coil 63 is energized with an alternating current, secondary currents are induced and the metal disposed within chamber 64. These secondary currents are converted into heat by the electrical resistance of the charge and in addition a vigorous stirring action is produced. Induction furnaces are generally employed to provide relatively homogeneous melts made possible by this stirring action. Generally, oxidation and reduction of metal are not carried out in induction furnaces. By the use of the tuyere system 11b, however, oxidation, reduction and finishing as well as slag control can be effectively carried out in the induction furnace 60 by the introduction of oxygen, inert gases, hydrocarbon gases, and powdered materials such as lime, limestone, burnt lime, fluorspar or iron ore below the surface of the melt in the manner discussed above in relation to furnaces 10 and 50.

Figure 4:
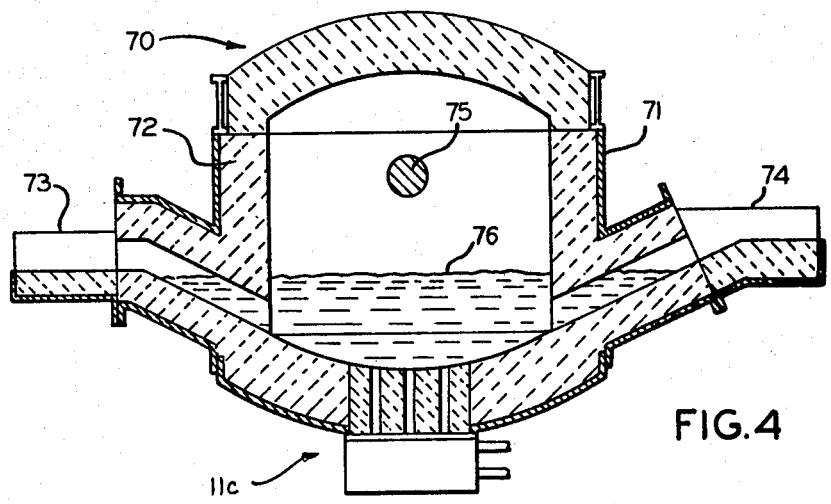
FIG. 4 schematically illustrates a holding furnace incorporating the instant invention.
Figure 5:
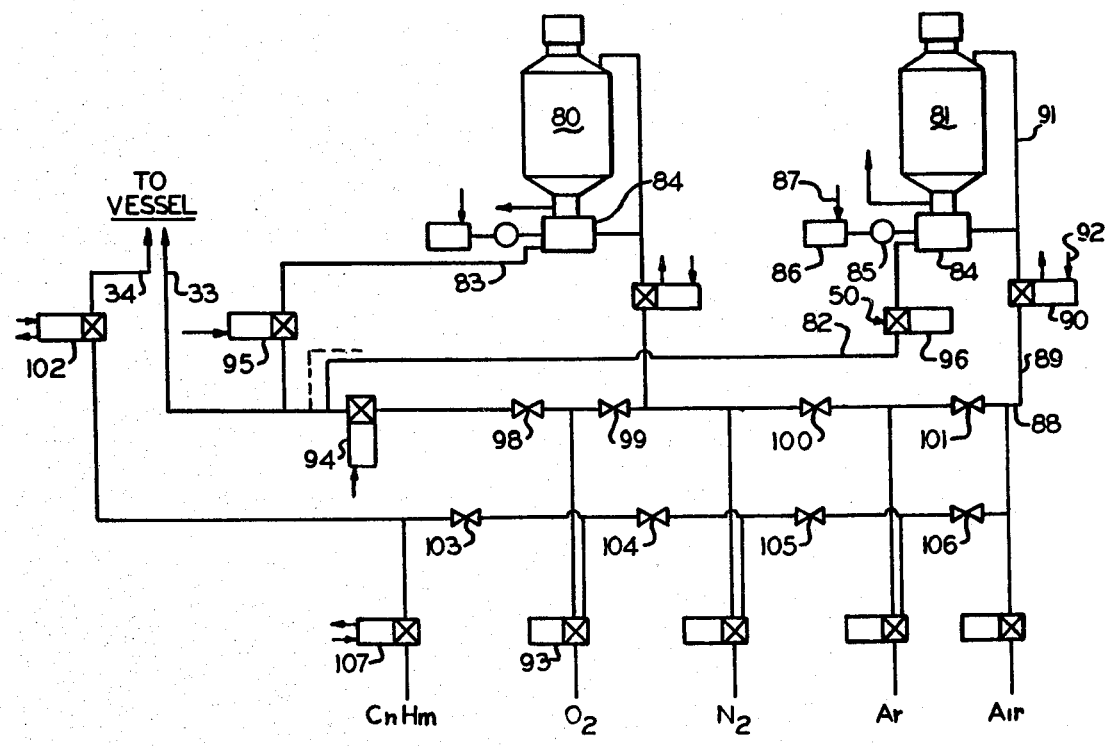
FIG. 5 schematically illustrates means for controlling the delivery of gases and other materials to the vessels shown in FIGS. 1-4.

FIG. 4 illustrates a holding furnace 70 which includes a metallic shell 71 and a refractory lining 72. Furnace 70 may be provided with a hot metal receiving spout 73 and a pouring spout 74. The furnace 70 normally receives hot metal 76 from a melting furnace, not shown, through pouring spout 73. The metal 76 is retained in furnace 70 until needed at which time the furnace is pivoted by means (not shown) which tilts the furnace about an axis normal to the plane of FIG. 4 for discharging metal 76 through pouring spout 74 and into a mold or tundish, for example. In order to maintain the melt 76 at the desired temperature, a heat source, such as graphite rod 75 may be provided. As those skilled in the art will appreciate, the rod 75 will be connected to a suitable source of electrical energy which will result in resistance heating of said rod and which heat is radiated to the bath 76.

Normally, metallurgical reactions are not performed in the holding furnace 70. The addition of a tuyere system 11c into the bottom of the furnace 70, however, permits the latter to be employed for the oxidation, refining or finishing of metal melts by the introduction of oxygen, carbonaceous materials, lime, burnt lime, limestone, fluorspar, etc., and inert gases as discussed hereinabove. The tuyere system 11c may be identical to that shown in FIG. 2 and will not be discussed in detail for the sake of brevity.

The method for controlling the delivery of gases and powdered materials to the various vessels 10, 50, 60 or 70 may be substantially identical. Accordingly, such apparatus will be discussed solely with respect to vessel 10 for the sake of brevity.

When a heat is in process in vessel 10, various gases, primarily oxygen, are delivered to the bath 22 through tuyere system 11 and powdered materials such as lime, burnt lime, limestone, iron oxide, desulfurizing agents, and fluorspar may be entrained from pressure vessels 80 and 81 in the gas stream and injected in the melt in accordance with the process requirements. Only two pressure vessels 80 and 81 for containing powdered material are shown but it will be understood that there will be as many pressure vessels as there are types of powdered materials which are to be injected into the bath 22 within vessel 10.

Powdered materials may be delivered consecutively or concurrently to tuyere system 11 through header pipes 82 and 83 which are connected to pipe 36 for furnishing the powdered materials. The powdered materials are, of course, entrained in whatever gas or gases that are being blown into vessel 10 at a particular time. It is necessary to mix the powdered material from a vessel such as 80 with entraining gas in definite proportion. For this purpose, the bottom of a vessel 81, for instance, is provided with a mixing device 84, the details of which are not shown, but are well known in the art. For example, the device 84 may be of the type which withdraws powdered material from vessel 80 and injects it into the gas stream. The device 84 may be operated by motive means 85 with a controller 86. The controller may be responsive to input signals from any suitable control source, as symbolized by the short arrowheaded line 87. Mixing device 84 and 84' are associated with each pressure vessel 80 and 81, respectively, and each is connected to as many sources of gas as might be blown in a particular installation. Thus, from a source of oxygen which is labeled $O_2$, oxygen may be delivered from a header 88 through a branch pipe 89, a remotely controllable valve 90 and a pipe 91 to mixing device 84. An arrow, such as 62, symbolizes that valve 60 receives control signals for throttling or turning off the flow of oxygen to mixing device 84. These control signals may be provided from any suitable control equipment (not shown).

Other control valves may also be interposed between mixing device 84 and the sources of other gases. However, only the aforementioned controllable valve 90, connected between an air source and mixing device 84, is shown for the sake of brevity. For example, there may be additional valves interposed between air, argon and nitrogen and gas sources which are respectively marked AIR, Ar and $N_2$. The other pressure vessels such as 80, containing powdered materials may also be supplied with these various gases through suitable pipes and valves, not shown.

The various gases may also be fed selectively into vessel 10 directly without entraining solid material if desired. The oxygen line, for instance, connects through remotely controllable valve 93 to gas header 88 which feeds through remotely controllable valve 94 to input pipe 36 and to tuyere system 11 at the bottom of vessel 10. Remote valves 95 and 96 for preventing reverse flow are also provided and there are also several valves 98–101 for variously directing and regulating gas flow. Similarly, remote controllable valve 102 and directional regulating valves 103–106 are provided to regulate and control the flow of various gases to the input pipe 33 of the second tuyere system 11. Hydrocarbon gas may be provided to pipe 33 through valves 102 and 107. Extending from each of the remote controlled valves is an arrow which symbolizes, as in respect to the previously discusses valves, that they are subject to control.

The use of the tuyere system in the metallurgical vessels 10, 50, 60 or 70 according to the invention, permits the more accurate performance of the desired metallurgical processed and economizes in fuel and electrical energy. Further, the stirring action of the introduction of gas through the bath promotes chemical reactions and a more homogeneous metal. This greater facility of chemical reactions and the heat generated as a result of the oxidation promoted by the introduction of oxygen, substantially shortens the required treatment periods. In addition, the use of the tuyere system 11 permits the performance of metallurgical processing in vessels not heretofore employed for this purpose.

While only a few embodiments of the inventions have been illustrated and described, it is not intended to be limited thereby but only by the scope of the appended claims.

We claim:

1. A method of melting scrap metal and refining the melted molten metal in an electric arc furnace having a shell provided with a mouth, a refractory lining on said shell, a removable roof for sealing said mouth, a melting electrode reciprocable through said roof into and out of contact with said scrap metal, a hearth line defining with said furnace an upper level of said molten metal and a tuyere extending through said shell and said refractory lining flush with said refractory lining and having an inner pipe and a concentric outer pipe defining an annulus with said inner pipe, said method including the steps of:
   a. charging said furnace with said scrap metal;
   b. melting a hole in said scrap metal to produce molten metal;
   c. energizing said electrode to heat said scrap metal with heat from said electrode;
   d. blowing an oxygen bearing gas from said inner pipe through said molten metal to decarburize said molten metal while simultaneously continuing to melt said scrap metal so that when said scrap metal has melted into molten metal the amount of residual carbon in said molten metal is less than a predetermined desired amount of carbon, thereby reducing substantially the melting and refining cycle and producing heat exothermically by the chemical combination of the carbon in the molten metal with the oxygen in the oxygen bearing gas to aid in the melting of said scrap metal; and
   e. refining said molten metal to the desired metallurgical composition and pouring temperature.

2. The method recited in claim 1 including the step of melting a hole in said scrap metal with said melting electrode to produce molten metal.

3. The method recited in claim 1 including the step of:
a. blowing a shroud gas through said annulus while blowing said oxygen bearing gas through said inner pipe to cool said inner pipe and prevent burning of the end of said inner pipe below the inner surface of said refractory lining.

4. The method recited in claim 1 including the step of:
a. blowing said oxygen bearing gas through said molten metal from the bottom of said furnace.

5. The method recited in claim 1 including the step of:
a. blowing said oxygen bearing gas from the bottom of said furnace through said molten metal at an angle inclined to the vertical axis of said furnace.

6. The method recited in claim 1 including the step of:
a. adding a fluxing agent through said inner pipe to said molten metal thereby removing sulfur and phosphorous from said molten metal.

7. The method recited in claim 1 including the step of:
a. adding a liquefying agent through said inner pipe to said molten metal thereby lowering the viscosity of a slag formed on said molten metal.

8. The method recited in claim 1 including the step of:
a. blowing an inert gas through said annulus into a stainless steel molten metal to lower the partial pressure of carbon monoxide in said molten metal so that the oxygen in said oxygen bearing gas combines with the carbon in said molten metal rather than with the chromium in said molten metal to produce a desired stainless steel thereby reducing to a minimum the amount of alloying agent required to cause the chromium to combine with the nickel in said stainless steel molten metal.

9. An electric arc furnace having:
a. a shell provided with a mouth;
b. a refractory lining on said shell;
c. a removable roof for sealing said mouth;
d. a hearth line defining with said furnace an upper level of said molten metal;
e. a tuyere extending through said shell and said refractory lining terminating flush with said refractory lining and having an inner pipe and a concentric outer pipe defining an annulus with said inner pipe;
f. means for charging said furnace with said scrap metal;
g. means for melting a hole in said scrap metal to produce molten metal; and
h. means for blowing an oxygen bearing gas from said inner pipe through said molten metal to decarburize said molten metal while simultaneously continuing to melt said scrap metal so that when said scrap metal has melted into molten metal the amount of residual carbon in said molten metal is approximately equal to, either more or less than, a predetermined desired amount of carbon, thereby reducing substantially the melting and refining cycle and producing heat exothermically by the chemical combination of the carbon in the molten metal with the oxygen in the oxygen bearing gas to aid in the melting of said scrap metal.

10. The electric arc furnace recited in claim 9 wherein:
a. said charging means charges said furnace with said scrap metal up to a roof parting line of said furnace.

11. The electric arc furnace recited in claim 9 wherein:
a. said melting means includes an electrode which contacts said scrap metal and melts said scrap metal to produce molten metal in said furnace.

12. The electric arc furnace recited in claim 9 wherein:
a. said blowing means blows a shroud gas through said annulus to cool said inner pipe and prevent burning of the end of said inner pipe below the inner surface of said refractory lining.

13. The electric arc furnace recited in claim 9 wherein:
a. said tuyere is disposed in the bottom of said furnace.

14. The electric arc furnace recited in claim 9 wherein:
a. said tuyere is disposed in the bottom of said furnace and is inclined at an angle to the vertical axis of said furnace.

15. The electric arc furnace recited in claim 9 and having:
a. fluxing means associated with said blowing means for adding a fluxing agent through said inner pipe to said molten metal thereby removing sulfur and phosphorus from said molten metal.

16. The electric arc furnace recited in claim 9 and having:
a. liquefying means associated with said blowing means for adding a liquefying agent through said inner pipe to said molten metal thereby lowering the viscosity of a slag formed on said molten metal.

17. The electric arc furnace recited in claim 9 wherein:
a. said blowing means blows an inert gas through said annulus into a stainless steel molten metal to lower the partial pressure of the carbon monoxide in said molten metal so that the oxygen in said oxygen bearing gas combines with the carbon in said molten metal, rather than the chromium in said molten metal to produce a desired stainless steel thereby reducing to a minimum the amount of alloying agent required to cause the chromium to combine with the nickel in said stainless steel molten metal.

18. The electric arc furnace recited in claim 9 wherein:
a. said blowing means and said melting means superheats said molten metal so that the temperature of said molten metal approaches the temperature of said melted scrap metal.

19. An improved method of melting steel scrap and refining steel in an electric arc furnace having at least one electrode, comprising the steps of:
charging the furnace with steel scrap;
heating said scrap with said electrode to melt said scrap and provide a level of molten metal in said furnace;
blowing an oxygen bearing gas through a first tuyere submerged beneath the level of the liquid metal into the liquid metal to chemically react with the carbon and other constituents of the metal thereby oxidizing the carbon and other constituents and generating heat simultaneously with the heating by said electrode of said scrap;
blowing a shroud gas through an annulus around said first tuyere formed by a second concentric outer tuyere to cool said first tuyere and minimize its wear; and
refining said molten metal to the desired metallurgical composition and pouring temperature.

* * * * *